United States Patent
Lu et al.

(10) Patent No.: US 7,003,389 B2
(45) Date of Patent: Feb. 21, 2006

(54) SYSTEM AND METHOD FOR CHARACTERIZING VEHICLE BODY TO ROAD ANGLE FOR VEHICLE ROLL STABILITY CONTROL

(75) Inventors: Jianbo Lu, Livonia, MI (US); Todd Allen Brown, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 69 days.

(21) Appl. No.: 10/610,279

(22) Filed: Jun. 30, 2003

(65) Prior Publication Data

US 2004/0064237 A1    Apr. 1, 2004

Related U.S. Application Data

(60) Provisional application No. 60/400,172, filed on Aug. 1, 2002, provisional application No. 60/400,261, filed on Aug. 1, 2002, provisional application No. 60/400,375, filed on Aug. 1, 2002, provisional application No. 60/400,376, filed on Aug. 1, 2002.

(51) Int. Cl.
B60T 8/00    (2006.01)

(52) U.S. Cl. .............................. 701/70; 701/38; 701/72; 340/440; 340/429; 180/197

(58) Field of Classification Search .................. 701/36, 701/38, 45, 70, 72, 75; 180/197; 280/755; 303/146
See application file for complete search history.

(56) References Cited

U.S. PATENT DOCUMENTS

| | | |
|---|---|---|
| 2,917,126 A | 12/1959 | Phillips |
| 3,604,273 A | 9/1971 | Kwok et al. |
| 3,608,925 A | 9/1971 | Murphy |
| 3,899,028 A | 8/1975 | Morris et al. |
| 3,948,567 A | 4/1976 | Kasselmann et al. |
| 3,972,543 A | 8/1976 | Presley et al. |
| 4,023,864 A | 5/1977 | Lang et al. |
| RE30,550 E | 3/1981 | Reise |
| 4,480,714 A | 11/1984 | Yabuta et al. |
| 4,592,565 A | 6/1986 | Eagle |
| 4,597,462 A | 7/1986 | Sano et al. |
| 4,650,212 A | 3/1987 | Yoshimura |
| 4,679,808 A | 7/1987 | Ito et al. |
| 4,690,553 A | 9/1987 | Fukamizu et al. |
| 4,761,022 A | 8/1988 | Ohashi |
| 4,765,649 A | 8/1988 | Ikemoto et al. |

(Continued)

FOREIGN PATENT DOCUMENTS

DE    36 16 907    11/1987

(Continued)

OTHER PUBLICATIONS

A method for reducing on-road rollovers—anti-rollover braking, Thomas J. Wielenga, Dynamotive, LLC, International Congress and Exposition, Detroit, Michigan, Mar. 1-4, 1999.

(Continued)

*Primary Examiner*—Michael J. Zanelli
*Assistant Examiner*—Eric M. Gibson
(74) *Attorney, Agent, or Firm*—Fredrick Owens

(57) ABSTRACT

A control system (18) for an automotive vehicle (10) having a safety system includes a controller (26) determining a first body to road angle; determining a second body to road angle; determining a final body to road angle from the first body to road angle and the second body to road angle; and controlling the safety system in response to the final body to road signal.

25 Claims, 6 Drawing Sheets

U.S. PATENT DOCUMENTS

| | | |
|---|---|---|
| 4,767,588 A | 8/1988 | Ito |
| 4,778,773 A | 10/1988 | Sukegawa |
| 4,809,183 A | 2/1989 | Eckert |
| 4,827,416 A | 5/1989 | Kawagoe et al. |
| 4,872,116 A | 10/1989 | Ito et al. |
| 4,888,696 A | 12/1989 | Akatsu et al. |
| 4,898,431 A | 2/1990 | Karnopp et al. |
| 4,930,082 A | 5/1990 | Harara et al. |
| 4,951,198 A | 8/1990 | Watanabe et al. |
| 4,960,292 A | 10/1990 | Sadler |
| 4,964,679 A | 10/1990 | Rath |
| 4,967,865 A | 11/1990 | Schindler |
| 4,976,330 A | 12/1990 | Matsumoto |
| 4,998,593 A | 3/1991 | Karnopp et al. |
| 5,033,770 A | 7/1991 | Kamimura et al. |
| 5,058,017 A | 10/1991 | Adachi et al. |
| 5,066,041 A | 11/1991 | Kindermann et al. |
| 5,088,040 A | 2/1992 | Matsuda et al. |
| 5,089,967 A | 2/1992 | Haseda et al. |
| 5,163,319 A | 11/1992 | Spies et al. |
| 5,200,896 A | 4/1993 | Sato et al. |
| 5,208,749 A | 5/1993 | Adachi et al. |
| 5,224,765 A | 7/1993 | Matsuda |
| 5,228,757 A | 7/1993 | Ito et al. |
| 5,239,868 A | 8/1993 | Takenaka et al. |
| 5,247,466 A | 9/1993 | Shimada et al. |
| 5,261,503 A | 11/1993 | Yasui |
| 5,265,020 A | 11/1993 | Nakayama |
| 5,278,761 A | 1/1994 | Ander et al. |
| 5,282,134 A | 1/1994 | Gioutsos et al. |
| 5,311,431 A | 5/1994 | Cao et al. |
| 5,324,102 A | 6/1994 | Roll et al. |
| 5,335,176 A | 8/1994 | Nakamura |
| 5,365,439 A | 11/1994 | Momose et al. |
| 5,370,199 A | 12/1994 | Akuta et al. |
| 5,408,411 A | 4/1995 | Nakamura et al. |
| 5,446,658 A | 8/1995 | Pastor et al. |
| 5,510,989 A | 4/1996 | Zabler et al. |
| 5,548,536 A | 8/1996 | Ammon |
| 5,549,328 A | 8/1996 | Cubalchini |
| 5,579,245 A | 11/1996 | Kato |
| 5,598,335 A | 1/1997 | You |
| 5,602,734 A | 2/1997 | Kithil |
| 5,610,575 A | 3/1997 | Gioutsos |
| 5,627,756 A | 5/1997 | Fukada et al. |
| 5,634,698 A | 6/1997 | Cao et al. |
| 5,640,324 A | 6/1997 | Inagaki |
| 5,648,903 A | 7/1997 | Liubakka |
| 5,671,982 A | 9/1997 | Wanke |
| 5,676,433 A | 10/1997 | Inagaki et al. |
| 5,694,319 A | 12/1997 | Suissa et al. |
| 5,703,776 A | 12/1997 | Soung |
| 5,707,117 A | 1/1998 | Hu et al. |
| 5,707,120 A | 1/1998 | Monzaki et al. |
| 5,720,533 A | 2/1998 | Pastor et al. |
| 5,723,782 A | 3/1998 | Bolles, Jr. |
| 5,732,377 A | 3/1998 | Eckert |
| 5,732,378 A | 3/1998 | Eckert et al. |
| 5,732,379 A | 3/1998 | Eckert et al. |
| 5,736,939 A | 4/1998 | Corcoran |
| 5,737,224 A | 4/1998 | Jeenicke et al. |
| 5,740,041 A | 4/1998 | Iyoda |
| 5,742,918 A | 4/1998 | Ashrafi et al. |
| 5,742,919 A | 4/1998 | Ashrafi et al. |
| 5,762,406 A | 6/1998 | Yasui et al. |
| 5,782,543 A | 7/1998 | Monzaki et al. |
| 5,787,375 A | 7/1998 | Madau et al. |
| 5,801,647 A | 9/1998 | Survo et al. |
| 5,809,434 A | 9/1998 | Ashrafi et al. |
| 5,816,670 A | 10/1998 | Yamada et al. |
| 5,825,284 A | 10/1998 | Dunwoody et al. |
| 5,857,535 A | 1/1999 | Brooks |
| 5,869,943 A | 2/1999 | Nakashima et al. |
| 5,878,357 A | 3/1999 | Sivashankar et al. |
| 5,893,896 A | 4/1999 | Imamura et al. |
| 5,925,083 A | 7/1999 | Ackermann |
| 5,931,546 A | 8/1999 | Nakashima et al. |
| 5,944,137 A | 8/1999 | Moser et al. |
| 5,944,392 A | 8/1999 | Tachihata et al. |
| 5,946,644 A | 8/1999 | Cowan et al. |
| 5,964,819 A | 10/1999 | Naito |
| 5,971,503 A | 10/1999 | Joyce et al. |
| 6,002,974 A | 12/1999 | Schiffmann |
| 6,002,975 A | 12/1999 | Schiffmann et al. |
| 6,026,926 A | 2/2000 | Noro et al. |
| 6,038,495 A | 3/2000 | Schiffmann |
| 6,040,916 A | 3/2000 | Griesinger |
| 6,050,360 A | 4/2000 | Pattok et al. |
| 6,055,472 A | 4/2000 | Breunig et al. |
| 6,062,336 A | 5/2000 | Amberkar et al. |
| 6,065,558 A | 5/2000 | Wielenga |
| 6,073,065 A | 6/2000 | Brown et al. |
| 6,079,513 A | 6/2000 | Nishizaki et al. |
| 6,081,761 A | 6/2000 | Harada et al. |
| 6,085,133 A * | 7/2000 | Keuper et al. ............... 701/37 |
| 6,085,860 A | 7/2000 | Hackl et al. |
| 6,086,168 A | 7/2000 | Rump |
| 6,089,344 A | 7/2000 | Baughn et al. |
| 6,104,284 A | 8/2000 | Otsuka |
| 6,122,568 A | 9/2000 | Madau et al. |
| 6,122,584 A | 9/2000 | Lin et al. |
| 6,129,172 A | 10/2000 | Yoshida et al. |
| 6,141,604 A | 10/2000 | Mattes et al. |
| 6,141,605 A | 10/2000 | Joyce |
| 6,144,904 A | 11/2000 | Tseng |
| 6,149,251 A | 11/2000 | Wuerth et al. |
| 6,161,905 A | 12/2000 | Hac et al. |
| 6,169,939 B1 | 1/2001 | Raad et al. |
| 6,169,946 B1 * | 1/2001 | Griessbach ............... 701/45 |
| 6,176,555 B1 | 1/2001 | Semsey |
| 6,178,375 B1 | 1/2001 | Breunig |
| 6,179,310 B1 | 1/2001 | Clare et al. |
| 6,179,394 B1 | 1/2001 | Browalski et al. |
| 6,184,637 B1 | 2/2001 | Yamawaki et al. |
| 6,185,485 B1 | 2/2001 | Ashrafti et al. |
| 6,186,267 B1 | 2/2001 | Hackl et al. |
| 6,192,305 B1 | 2/2001 | Schiffmann |
| 6,195,606 B1 | 2/2001 | Barta et al. |
| 6,198,988 B1 | 3/2001 | Tseng |
| 6,202,009 B1 | 3/2001 | Tseng |
| 6,202,020 B1 | 3/2001 | Kyrtsos |
| 6,206,383 B1 | 3/2001 | Burdock |
| 6,219,604 B1 | 4/2001 | Dilger et al. |
| 6,223,114 B1 | 4/2001 | Boros et al. |
| 6,226,579 B1 | 5/2001 | Hackl et al. |
| 6,233,510 B1 | 5/2001 | Platner et al. |
| 6,263,261 B1 | 7/2001 | Brown et al. |
| 6,266,596 B1 | 7/2001 | Hartman et al. |
| 6,272,420 B1 | 8/2001 | Schramm et al. |
| 6,278,930 B1 | 8/2001 | Yamada et al. |
| 6,282,471 B1 | 8/2001 | Burdock et al. |
| 6,282,472 B1 | 8/2001 | Jones et al. |
| 6,282,474 B1 | 8/2001 | Chou et al. |
| 6,292,734 B1 | 9/2001 | Murakami et al. |
| 6,292,759 B1 | 9/2001 | Schiffmann |
| 6,311,111 B1 | 10/2001 | Leimbach et al. |
| 6,314,329 B1 | 11/2001 | Madau et al. |
| 6,315,373 B1 | 11/2001 | Yamada et al. |
| 6,321,141 B1 | 11/2001 | Leimbach |
| 6,324,446 B1 | 11/2001 | Brown et al. |
| 6,324,458 B1 | 11/2001 | Takagi et al. |
| 6,330,522 B1 | 12/2001 | Takeuchi |
| 6,332,104 B1 | 12/2001 | Brown et al. |
| 6,338,012 B1 | 1/2002 | Brown et al. |

| | | | |
|---|---|---|---|
| 6,349,247 B1 | 2/2002 | Schramm et al. | |
| 6,351,694 B1 | 2/2002 | Tseng et al. | |
| 6,352,318 B1 | 3/2002 | Hosomi et al. | |
| 6,356,188 B1 | 3/2002 | Meyers et al. | |
| 6,370,938 B1 | 4/2002 | Leimbach et al. | |
| 6,394,240 B1 | 5/2002 | Barwick | |
| 6,397,127 B1 | 5/2002 | Meyers et al. | |
| 6,419,240 B1 | 7/2002 | Burdock et al. | |
| 6,428,118 B1 | 8/2002 | Blosch | |
| 6,438,463 B1 * | 8/2002 | Tobaru et al. | 701/1 |
| 6,438,464 B1 | 8/2002 | Woywod et al. | |
| 6,477,480 B1 | 11/2002 | Tseng et al. | |
| 6,496,758 B1 | 12/2002 | Rhode et al. | |
| 6,496,763 B1 | 12/2002 | Griessbach | |
| 6,498,976 B1 | 12/2002 | Ehlbeck et al. | |
| 6,502,023 B1 | 12/2002 | Fukada | |
| 6,547,022 B1 | 4/2003 | Hosomi et al. | |
| 6,554,293 B1 | 4/2003 | Fennel et al. | |
| 6,556,908 B1 | 4/2003 | Lu et al. | |
| 6,559,634 B1 | 5/2003 | Yamada | |
| 6,681,196 B1 | 1/2004 | Glaser et al. | |
| 2002/0014799 A1 | 2/2002 | Nagae | |
| 2002/0040268 A1 | 4/2002 | Yamada et al. | |
| 2002/0056582 A1 | 5/2002 | Chubb | |
| 2002/0075139 A1 | 6/2002 | Yamamoto et al. | |
| 2002/0082749 A1 * | 6/2002 | Meyers et al. | 701/1 |
| 2002/0096003 A1 | 7/2002 | Yamada et al. | |
| 2002/0139599 A1 | 10/2002 | Lu | |

FOREIGN PATENT DOCUMENTS

| | | |
|---|---|---|
| DE | 38 15 938 | 11/1989 |
| DE | 43 21 571 | 1/1994 |
| DE | 42 27 886 | 2/1994 |
| DE | 43 35 979 | 4/1995 |
| DE | 43 42 732 | 6/1995 |
| DE | 199 07 633 | 10/1999 |
| EP | 0 430 813 | 12/1993 |
| EP | 0 662 601 | 7/1995 |
| EP | 0 758 601 | 2/1997 |
| EP | 983919 A2 * | 3/2000 |
| FR | 24 25 342 | 12/1979 |
| GB | 2257403 | 1/1993 |
| GB | 2 342 078 | 4/2000 |
| JP | 62055211 | 9/1985 |
| JP | 63116918 | 5/1988 |
| JP | 63151539 | 6/1988 |
| JP | 63203456 | 8/1988 |
| JP | 1101238 | 4/1989 |
| JP | 2171373 | 7/1990 |
| JP | 3042360 | 2/1991 |
| JP | 3045452 | 2/1991 |
| JP | 4008837 | 1/1992 |
| JP | 5016699 | 1/1993 |
| JP | 5254406 | 10/1993 |
| JP | 6278586 | 10/1994 |
| JP | 6297985 | 10/1994 |
| JP | 6312612 | 11/1994 |
| JP | 8080825 | 3/1996 |
| JP | 9005352 | 1/1997 |
| JP | 10024819 | 1/1998 |
| JP | 10329682 | 12/1998 |
| JP | 11011272 | 1/1999 |
| JP | 11170992 | 6/1999 |
| JP | 11254992 | 9/1999 |
| JP | 11255093 | 9/1999 |
| JP | 11304663 | 10/1999 |
| JP | 11304662 | 11/1999 |
| SU | 816849 | 3/1981 |

OTHER PUBLICATIONS

Eger, R., Majjad, R., Naser, N., "Rollover simulation based on a nonlinear model", SAE 98020.

Nalecz, A.G., Bindemann, A.C., Brewer H.K., "Dynamic analysis of vehicle rollover", 12th International Conference on Experimental Safety Vehicles, Goteborg, Sweden, May 29-Jun. 1, 1989.

Niii, N., Nishijima, Y., Nakagaw, K., "rollover analysis method of a large-size bus", JSAE 9540020, 1995.

Eger, R., Kiencke, U., "Modeling of rollover sequences", Control Engineering Practice 11 (2003) 209-216.

* cited by examiner

SYSTEM AND METHOD FOR CHARACTERIZING VEHICLE BODY TO ROAD ANGLE FOR VEHICLE ROLL STABILITY CONTROL

RELATED APPLICATIONS

The present invention claims priority to U.S. provisional applications Ser. Nos. 60/400,172, 60/400,261, 60/400,375, and 60/400,376, filed Aug. 1, 2002, the disclosures of which are incorporated by reference herein. The present invention is also related to U.S. Applications Ser. No. 10/610,280 entitled "SYSTEM AND METHOD FOR CHARACTERIZING THE ROAD BANK FOR VEHICLE ROLL STABILITY CONTROL", and Ser. No. 10/610,278 entitled "SYSTEM AND METHOD FOR DETERMINING A WHEEL DEPARTURE ANGLE FOR A ROLLOVER CONTROL SYSTEM", filed simultaneously herewith.

TECHNICAL FIELD

The present application relates generally to a control apparatus for controlling a system of an automotive vehicle in response to sensed dynamic behavior, and more specifically, to a method and apparatus for controlling the roll characteristics of the vehicle by characterizing the vehicle body to road angle on which the vehicle is having a potential rollover event.

BACKGROUND

Dynamic control systems for automotive vehicles have recently begun to be offered on various products. Dynamic control systems typically control the yaw of the vehicle by controlling the braking effort at the various wheels of the vehicle. Yaw control systems typically compare the desired direction of the vehicle based upon the steering wheel angle and the direction of travel. By regulating the amount of braking at each corner of the vehicle, the desired direction of travel may be maintained. Typically, the dynamic control systems do not address roll of the vehicle. For high profile vehicles in particular, it would be desirable to control the rollover characteristic of the vehicle to maintain the vehicle position with respect to the road. That is, it is desirable to maintain contact of each of the four tires of the vehicle on the road.

In vehicle roll stability control it is desired to alter the vehicle attitude such that its motion along the roll direction is prevented from achieving a predetermined limit (rollover limit) with the aid of the actuation from the available active systems such as controllable brake system, steering system and suspension system. Although the vehicle attitude is well defined, direct measurement is usually impossible.

There are two types of vehicle attitudes needed to be distinguished. One is the so-called global attitude, which is sensed by the angular rate sensors. The other is the relative attitude, which measures the relative angular positions of the vehicle with respect to the road surface on which the vehicle is driven. The global attitude of the vehicle is relative to an earth frame (or called the inertia frame), sea level, or a flat road. It can be directly related to the three angular rate gyro sensors. While the relative attitude of the vehicle measures the relative angular positions of the vehicle with respect to the road surface, which are always of various terrains. Unlike the global attitude, there are no gyro-type sensors that can be directly related to the relative attitude. A reasonable estimate is that a successful relative attitude sensing system utilizes both the gyro-type sensors (when the road becomes flat, the relative attitude sensing system recovers the global attitude) and some other sensor signals.

One reason to distinguish relative and global attitude is due to the fact that vehicles are usually driven on a three-dimensional road surface of different terrains, not always on a flat road surface. Driving on a road surface with a large road bank does increase the rollover tendency, i.e., a large output from the global attitude sensing system might well imply an uncontrollable rollover event regardless of the flat road driving and the 3-D road driving. However driving on a three-dimensional road with moderate road bank angle, the global attitude may not be able to provide enough fidelity for a rollover event to be distinguished. Vehicular rollover happens when one side of the vehicle is lifted from the road surface with a long duration of time without returning back. If a vehicle is driven on a banked road, the global attitude sensing system will pick up certain attitude information even when the vehicle does not experience any wheel lifting (four wheels are always contacting the road surface). Hence a measure of the relative angular positions of the vehicle with respect to the portion of the road surface on which the vehicle is driven provides more fidelity than global attitude to sense the rollover event when the vehicle is driven on a road with a moderate bank angle. Such an angle is called body-to-road roll angle and it is used as one of the key variables in the roll stability control module to compute the amount of actuation needed for preventing untripped rollover event.

When the vehicle does not have one side lifted, U.S. Pat. No. 6,556,908 does provide a method to calculate the relative attitudes and their accuracy may be affected by the vehicle loading, suspension and tire conditions. However, during a potential rollover event, such a relative roll angle is not a good measure of the true relative roll angle between vehicle body and the road surface. U.S. patent application Ser. No. 10/459,697 (FGT-1660)) provides another way to compute the true relative roll angle during a potential rollover event. This application is suited for cases where vehicle loading and suspension conditions are very close to the nominal systems. If the vehicle has large loading variations (especially roof loading), potential inaccuracy could cause false activations in roll stability controls.

During a potential rollover event, one or two wheels on the inside of the vehicle turn are up in the air and there is an angle between the axle of the lifted wheel and road surface. Such an angle is called a wheel departure angle. If such a wheel departure can be somehow characterized, the true body-to-road roll angle can be conceptually obtained as the sum of the wheel departure angle and the relative roll angle calculated in U.S. Pat. No. 6,556,908.

Another way to capture the true body-to-road roll angle is to use the resultant angle obtained by subtracting the road bank angle for the global roll angle calculated for example in U.S. patent application Ser. No. 09/967,038, filed Oct. 1, 2001. Although this method is theoretically feasible, it has inevitable drawbacks. The first drawback lies in the computation of the road bank angle, since there is no robust and accurate computation of road banks using the existing sensor set. Secondly, the global roll angle computation as shown in U.S. patent application Ser. No. 09/967,038 may be affected by the accuracy of the low frequency bank angle estimation.

Therefore, the aforementioned two methods of computing the body-to-road roll angle may not deliver accurate enough body-to-road roll angle for roll stability control purpose in certain situations. Because each of the individual methods described above does provide accurate measure with certain conditions, a sensor fusion algorithm would be a way to obtain an angle good for roll stability control. Such a sensor fusion method needs to integrate the various angles and conduct signal sensitizing and desensitizing, which may include the computations of (i) global roll angle as discussed in U.S. patent application Ser. No. 09/967,038; (ii) relative roll angle as discussed in U.S. Pat. No. 6,556,908; (iii) a rough characterization of the road bank angle, which is called a reference road bank angle); (iv) wheel departure angle; (v) body-to-road roll angle; (vi) transition and rollover condition.

The aforementioned computation is not only good for roll stability control, but also for other applications. For example, the reference road bank angle could be used in an active anti-roll-bar control, the yaw stability control, etc. An active roll control system using a controlled anti-roll-bar does not respond suitably to the side bank in the conventional setting, since the presence of road side bank cannot be detected and the system therefore responds to a side bank as if the vehicle were cornering. This can result in unnecessary power consumption for the active anti-roll-bar system. In order to eliminate this, U.S. Pat. No. 6,282,471 provides a very crude estimation of the road side bank using lateral acceleration sensor and vehicle reference speed. A vehicle driven on a road with a sharp side bank may cause false activation for the yaw stability control system and/or roll stability control system due to the fact that large lateral motion is determined through sensor signals even if the vehicle is driven in steady state condition on the banked road.

Therefore, it is desirable in vehicle dynamics control, especially for roll stability control to detect accurately a wheel departure angle so as to accurately predict the true roll position of the vehicle to properly activate the vehicle control systems.

SUMMARY

A system for determining a body to road angle is set forth herein. The process may be iterative and continuous so that a previous or body to road angle determination or estimate is used to find an updated or second body to road angle.

In one embodiment, a control system for an automotive vehicle having a safety system includes a controller determining a first body to road angle; determining a second body to road angle; determining a final body to road angle from the first body to road angle and the second body to road angle; and controlling the safety system in response to the final body to road signal.

In another embodiment, a method of controlling a safety system of an automotive vehicle comprises determining a wheel departure angle; determining a relative roll angle; determining a first body to road angle in response to the wheel departure angle and the relative roll angle; determining a reference bank angle; determining a global roll angle; determining a second body to road angle from the reference bank angle and the global roll angle; determining a final body to road angle from the first body to road angle and the second body to road angle; and controlling a safety system in response to the final body to road signal.

Other advantages and features of the present invention will become apparent when viewed in light of the detailed description of the preferred embodiment when taken in conjunction with the attached drawings and appended claims.

DETAILED DESCRIPTION

Figure 1:
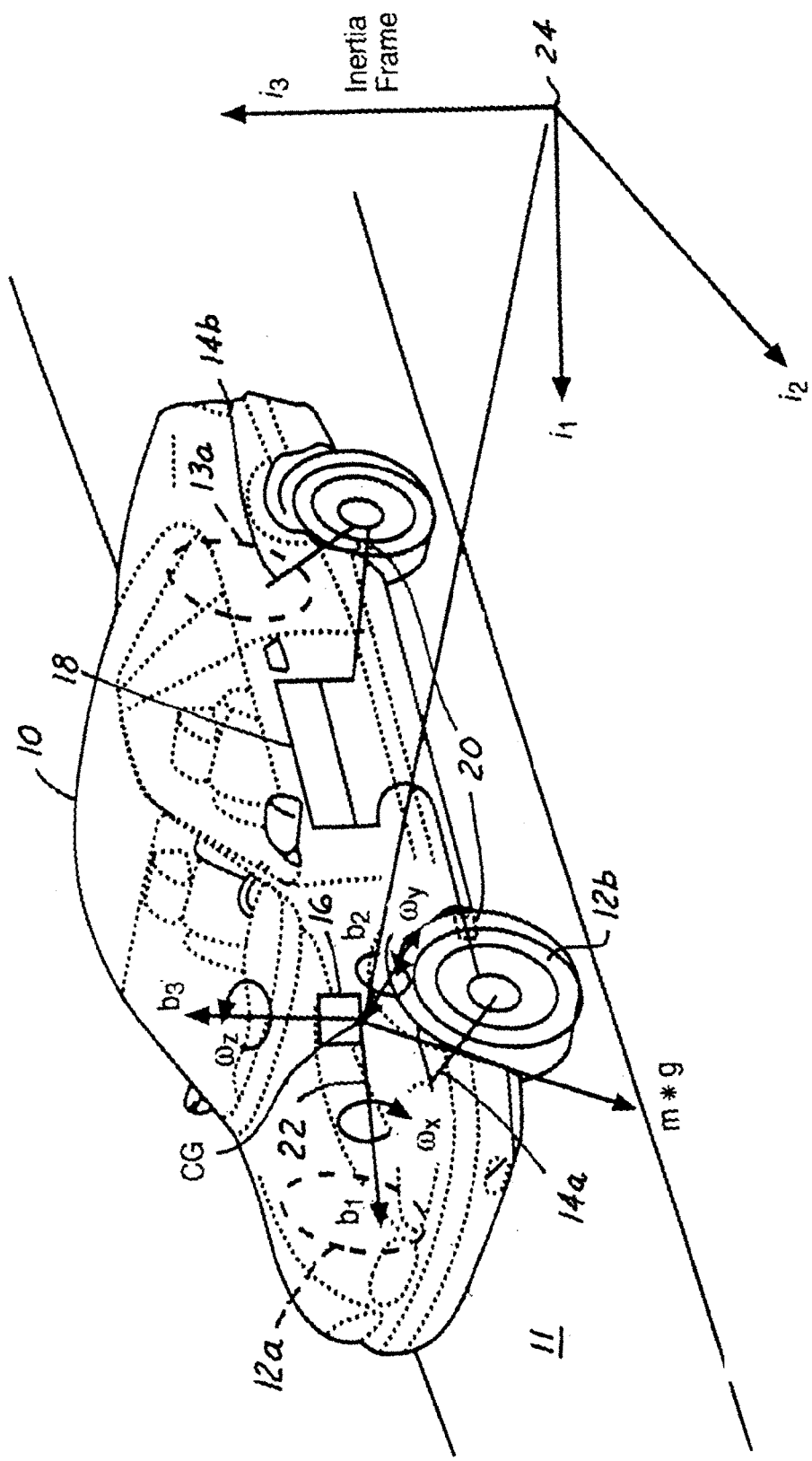
FIG. 1 is a diagrammatic view of a vehicle with variable vectors and coordinator frames.

In the following figures the same reference numerals will be used to identify the same components. The present teachings may be used in conjunction with a yaw control system or a rollover control system for an automotive vehicle. However, the present teachings may also be used with a deployment device such as airbag or roll bar.

Referring to FIG. 1, an automotive vehicle 10 on a road surface 11 with a safety system is illustrated with the various forces and moments thereon. Vehicle 10 has front right and front left tires 12a and 12b and rear right tires and rear left tires 13a and 13b, respectively. The vehicle 10 may also have a number of different types of front steering systems 14a and rear steering systems 14b including having each of the front and rear wheels configured with a respective controllable actuator, the front and rear wheels having a conventional type system in which both of the front wheels are controlled together and both of the rear wheels are controlled together, a system having conventional front steering and independently controllable rear steering for each of the wheels, or vice versa. Generally, the vehicle has a weight represented as Mg at the center of gravity of the vehicle, where g=9.8 m/s² and M is the total mass of the vehicle.

As mentioned above, the system may also be used with active/semi-active suspension systems, anti-roll bar or other safety devices deployed or activated upon sensing predetermined dynamic conditions of the vehicle.

The sensing system 16 is part of a control system 18. The sensing system 16 may use a standard yaw stability control sensor set (including lateral acceleration sensor, yaw rate sensor, steering angle sensor and wheel speed sensor) together with a roll rate sensor and a longitudinal acceleration sensor. The various sensors will be further described below. The wheel speed sensors 20 are mounted at each corner of the vehicle, and the rest of the sensors of sensing system 16 may be mounted directly on the center of gravity of the vehicle body, along the directions x,y and z shown in FIG. 1. As those skilled in the art will recognize, the frame from $b_1$, $b_2$ and $b_3$ is called a body frame 22, whose origin is located at the center of gravity of the car body, with the $b_1$ corresponding to the x axis pointing forward, $b_2$ corresponding to the y axis pointing off the driving side (to the left), and the $b_3$ corresponding to the z axis pointing upward. The angular rates of the car body are denoted about their respective axes as $\omega_x$ for the roll rate, $\omega_y$ for the pitch rate and $\omega_z$ for the yaw rate. The calculations set forth herein may take place in an inertial frame 24 that may be derived from the body frame 22 as described below.

The angular rate sensors and the acceleration sensors are mounted on the vehicle car body along the body frame directions $b_1$, $b_2$ and $b_3$, which are the x-y-z axes of the vehicle's sprung mass.

The longitudinal acceleration sensor 36 is mounted on the car body located at the center of gravity, with its sensing direction along $b_1$-axis, whose output is denoted as $a_x$. The lateral acceleration sensor 32 is mounted on the car body located at the center of gravity, with its sensing direction along $b_2$-axis, whose output is denoted as $a_y$.

The other frame used in the following discussion includes the road frame, as depicted in FIG. 1. The road frame system $r_1r_2r_3$ is fixed on the driven road surface, where the $r_3$ axis is along the average road normal direction computed from the normal directions of the four-tire/road contact patches.

In the following discussion, the Euler angles of the body frame $b_1b_2b_3$ with respect to the road frame $r_1r_2r_3$ are denoted as $\theta_{xr}$, $\theta_{yr}$ and $\theta_{zr}$, which are also called the relative Euler angles.

Figure 2:
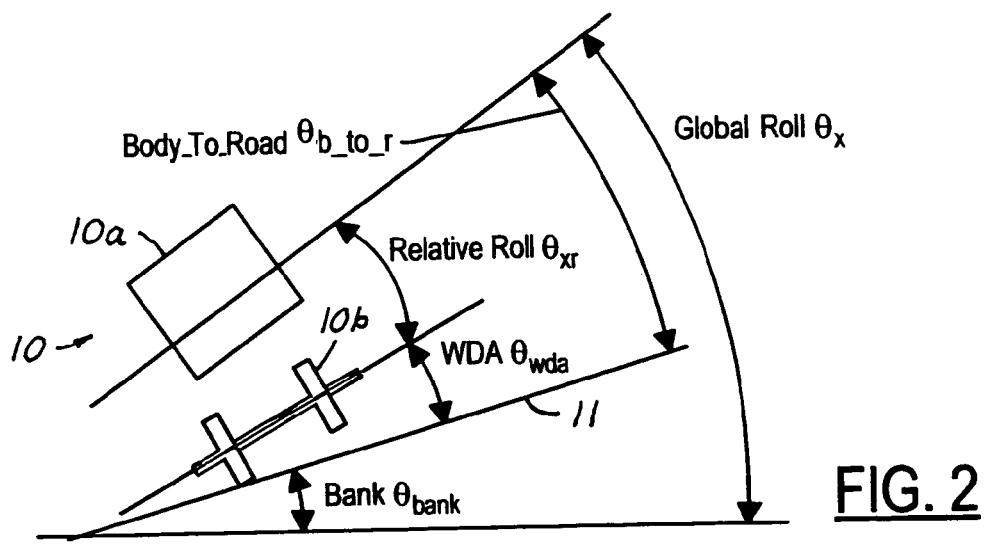
FIG. 2 is an end view of an automotive vehicle on a bank with definitions of various angles including global roll angle, relative roll angle, wheel departure angle (WDA), road bank angle and body-to-road angle.

Referring now to FIG. 2, the relationship of the various angles of the vehicle 10 relative to the road surface 11 is illustrated. The present teaching determines a wheel departure angle $\theta_{wda}$, which is the angle from the axle or the wheel axis to the road surface 11. Also shown is a reference road bank angle $\theta_{bank}$, which is shown relative to the vehicle 10 on a road surface. The vehicle 10 has a vehicle body 10a and vehicle suspension 10b. The relative roll angle $\theta_{xr}$ is the angle between the wheel axle and the body 10a. The global roll angle $\theta_x$ is the angle between the horizontal plane (e.g., at sea level) and the vehicle body 10a.

Figure 3A:
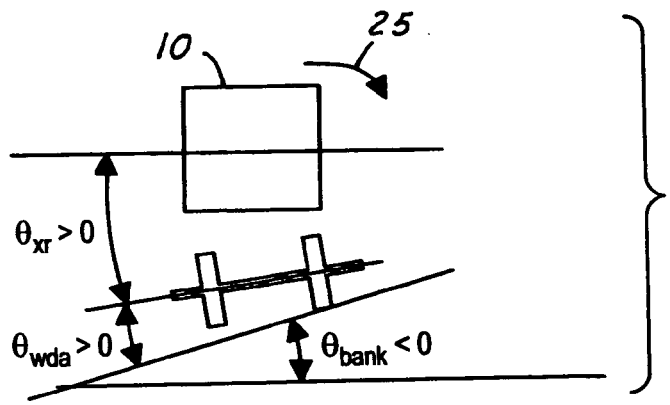
FIG. 3A is an end view of an on-camber divergent vehicle tendency.

Referring now to FIG. 3A, vehicle 10 is illustrated in an on-camber divergent state. The on-camber divergent state refers to the vehicle having a greater than 0 wheel departure angle, a greater than 0 relative roll angle, and a moment represented by arrow 25 tending to increase the relative roll angle and the wheel departure angle. In this example, the bank angle is less than 0.

Figure 3B:
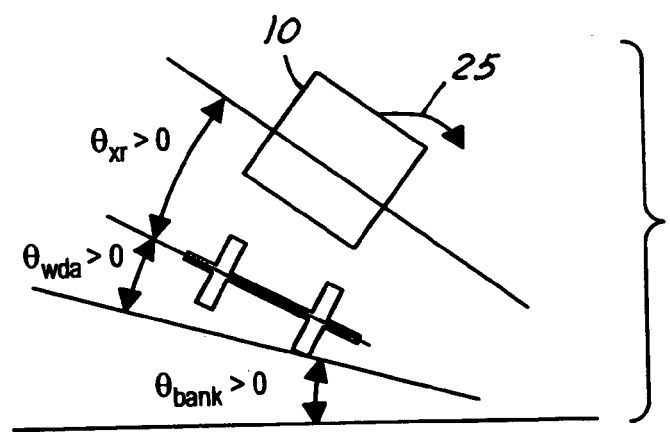
FIG. 3B is an end view of an automotive vehicle in an off-camber divergent condition.

In FIG. 3B, when the bank angle is greater than 0, the wheel departure angle is greater than 0, the relative roll angle is greater than 0 and the moment is also to the right or increasing the relative roll angle and the wheel departure angle, the vehicle is in an off-camber divergent state.

Figure 3C:
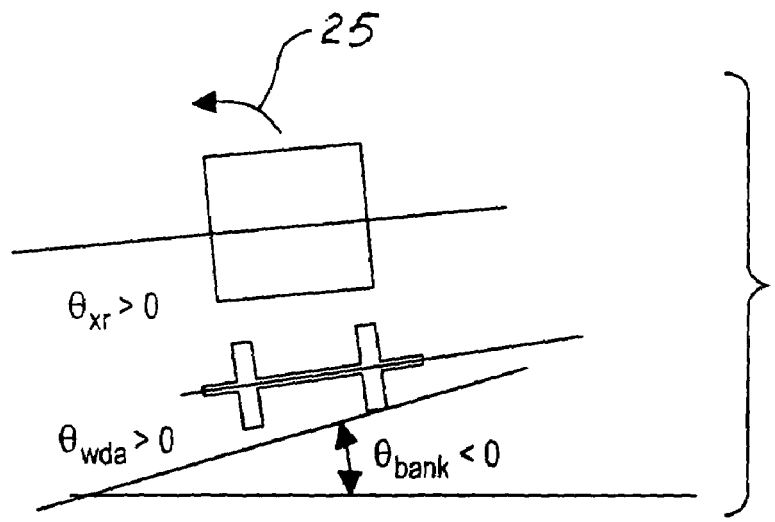
FIG. 3C is an end view of a vehicle in an on-camber convergent condition.

Referring now to FIG. 3C, a bank angle of less than 0, a wheel departure angle greater than 0, and a relative roll angle greater than 0 is shown with a roll moment 25 acting to the left. Thus, the vehicle is in an on-camber convergent state. That is, the convergent state refers to the vehicle tending towards not overturning.

Figure 3D:
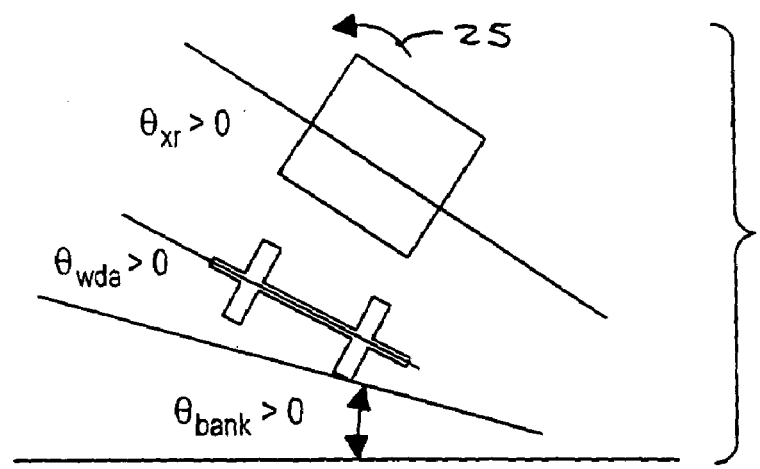
FIG. 3D is an end view of a vehicle in an off-camber convergent condition.

Referring now to FIG. 3D, when the bank angle is greater than 0, the wheel departure angle is greater than 0, and the relative roll angle is greater than 0 and the roll moment is tending to the left, the vehicle is in an off-camber convergent state. That is, the vehicle is tending toward not rolling over.

Figure 4A:
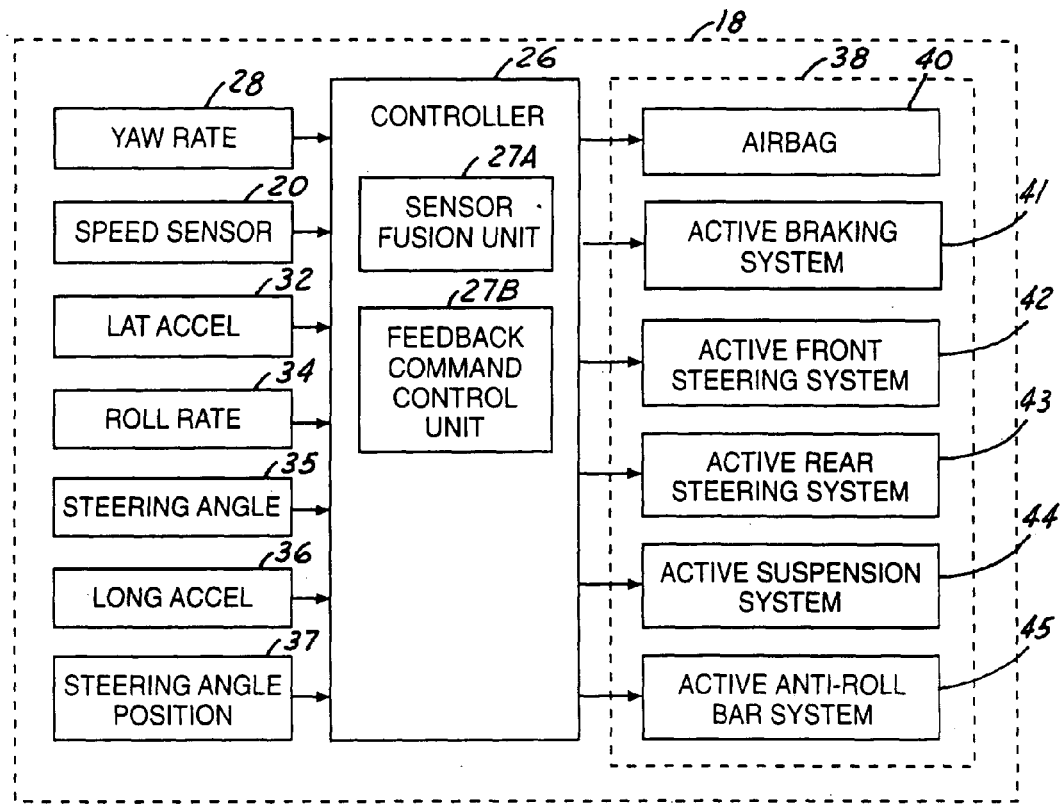
FIG. 4A is a block diagram of a stability control system.

Referring now to FIG. 4A, one embodiment of a roll stability control system 18 is illustrated in further detail having a controller 26 used for receiving information from a number of sensors which may include a yaw rate sensor 28, a speed sensor 20, a lateral acceleration sensor 32, a roll rate sensor 34, a steering angle sensor (hand wheel position) 35, a longitudinal acceleration sensor 36, and steering angle position sensor 37.

In one embodiment, the sensors are located at the center of gravity of the vehicle. Those skilled in the art will recognize that the sensors may also be located off the center of gravity and translated equivalently thereto.

Lateral acceleration, roll orientation and speed may be obtained using a global positioning system (GPS). Based upon inputs from the sensors, controller 26 may control a safety device 38. Depending on the desired sensitivity of the system and various other factors, not all the sensors 20, 28, 32, 34, 35, 36, and 37, or various combinations of the sensors, may be used in a commercial embodiment. Safety device 38 may control an airbag 40, an active braking system 41, an active front steering system 42, an active rear steering system 43, an active suspension system 44, and an active anti-roll bar system 45, or combinations thereof. Each of the systems 40–45 may have their own controllers for activating each one. As mentioned above, the safety system 38 may be at least the active braking system 41.

Roll rate sensor 34 may sense the roll condition of the vehicle based on sensing the height of one or more points on the vehicle relative to the road surface. Sensors that may be used to achieve this include a radar-based proximity sensor, a laser-based proximity sensor and a sonar-based proximity sensor.

Roll rate sensor 34 may also sense the roll condition based on sensing the linear or rotational relative displacement or displacement velocity of one or more of the suspension chassis components which may include a linear height or travel sensor, a rotary height or travel sensor, a wheel speed sensor used to look for a change in velocity, a steering wheel position sensor, a steering wheel velocity sensor and a driver heading command input from an electronic component that may include steer by wire using a hand wheel or joy stick.

The roll condition may also be sensed by sensing the force or torque associated with the loading condition of one or more suspension or chassis components including a pressure transducer in active air suspension, a shock absorber sensor such as a load cell, a strain gauge, the steering system absolute or relative motor load, the steering system pressure of the hydraulic lines, a tire lateral force sensor or sensors, a longitudinal tire force sensor, a vertical tire force sensor or a tire sidewall torsion sensor.

The roll condition of the vehicle may also be established by one or more of the following translational or rotational positions, velocities or accelerations of the vehicle including a roll gyro, the roll rate sensor 34, the yaw rate sensor 28, the lateral acceleration sensor 32, a vertical acceleration sensor, a vehicle longitudinal acceleration sensor, lateral or vertical speed sensor including a wheel-based speed sensor, a radar-based speed sensor, a sonar-based speed sensor, a laser-based speed sensor or an optical-based speed sensor.

Based on the inputs from sensors 20, 28, 32, 34, 35, 36, 37, controller 26 determines a roll condition and controls any one or more of the safety devices 40–45.

Speed sensor 20 may be one of a variety of speed sensors known to those skilled in the art. For example, a suitable speed sensor 20 may include a sensor at every wheel that is averaged by controller 26. The controller 26 translates the wheel speeds into the speed of the vehicle. Yaw rate, steering angle, wheel speed and possibly a slip angle estimate at each wheel may be translated back to the speed of the vehicle at the center of gravity. Various other algorithms are known to those skilled in the art. For example, if speed is determined while speeding up or braking around a corner, the lowest or highest wheel speed may not be used because of its error. Also, a transmission sensor may be used to determine vehicle speed.

Figure 4B:
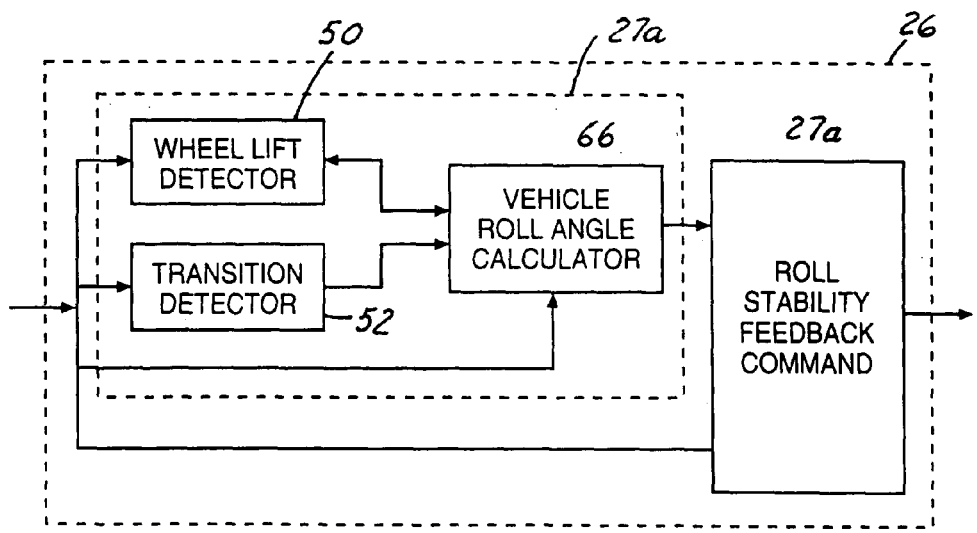
FIG. 4B is a block diagram of the controller 26 used in the stability control system depicted in FIG. 4A.

Referring now to FIGS. 4A and 4B, controller 26 is illustrated in further detail. There are two major functions in controller 26: the rollover trend determination, which is called a sensor fusion unit, 27A and the feedback control command unit 27B. The sensor fusion unit 27A can be further decomposed as a wheel lift detector 50, a transition detector 52 and a vehicle roll angle calculator 66.

Figure 5:
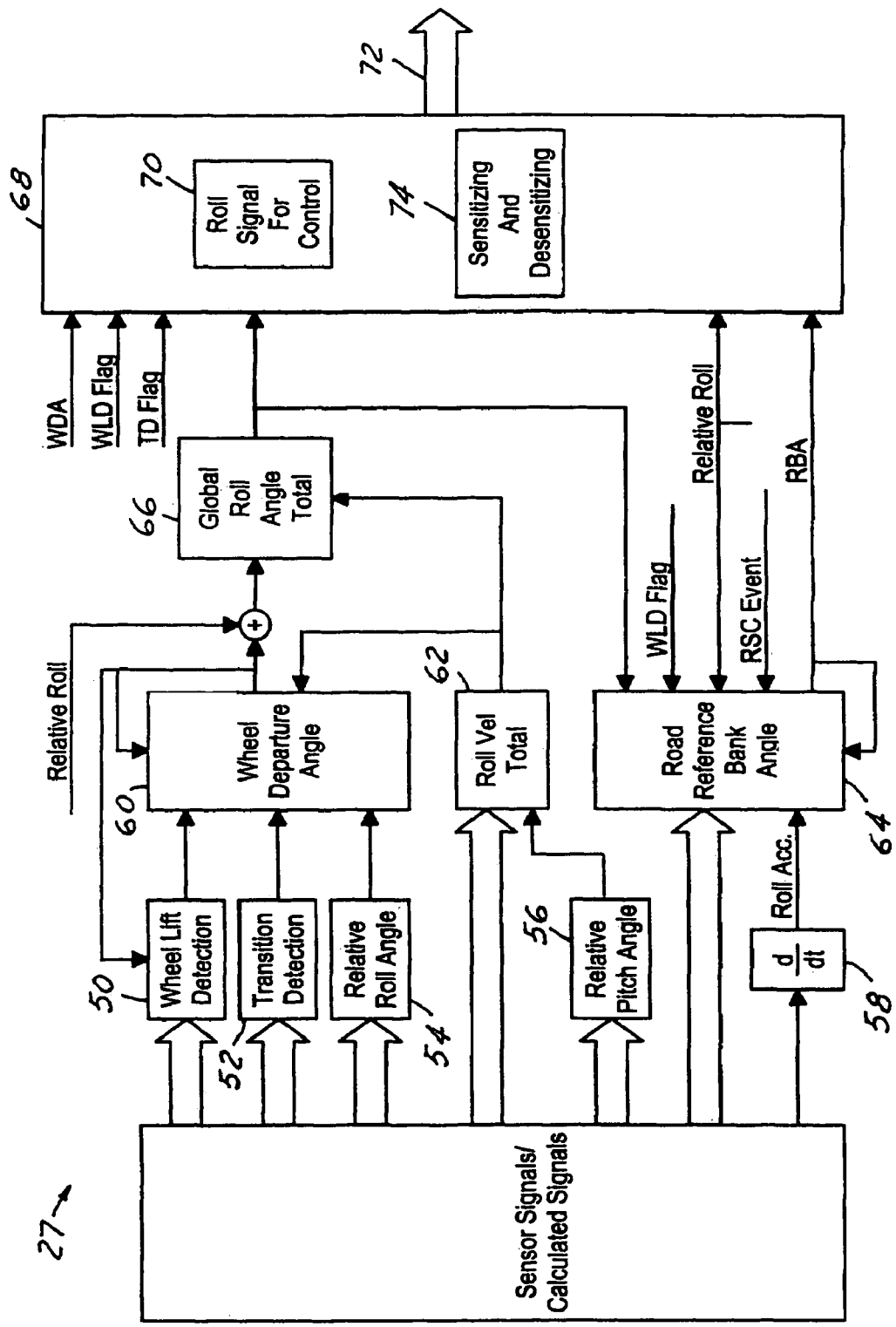
FIG. 5 is a block diagrammatic view of the unit 27 depicted in FIG. 4B, which is used for quantitatively and qualitatively determining rollover trend of a vehicle.

Referring now to FIG. 5, the sensor fusion unit 27A is illustrated in further detail. The sensor fusion unit 27A receives the various sensor signals, 20, 28, 32, 34, 35, 36, 37 and integrates all the sensor signals with the calculated signals to generate signals suitable for roll stability control algorithms. From the various sensor signals wheel lift detection may be determined by the wheel lift detector 50. Wheel lift detector 50 includes both active wheel lift detection and active wheel lift detection, and wheel grounding condition detection. Wheel lift detector is described in co-pending U.S. provisional application Ser. No. 60/400,375 filed Aug. 1, 2002, which is incorporated by reference herein. The modules described below may be implemented in hardware or software in a general purpose computer (microprocessor). From the wheel lift detection module 50, a determination of whether each wheel is absolutely grounded, possibly grounded, possibly lifted, or absolutely lifted may be determined. Transition detection module 52 is used to detect whether the vehicle is experiencing aggressive maneuver due to sudden steering wheel inputs from the driver. The sensors may also be used to determine a relative roll angle in relative roll angle module 54. Relative roll angle may be determined in many ways. One way is to use the roll acceleration module 58 in conjunction with the lateral acceleration sensor. As described above, the relative roll angle may be determined from the roll conditions described above.

The various sensor signals may also be used to determine a relative pitch angle in relative pitch angle module 56 and a roll acceleration in roll acceleration module 58. The outputs of the wheel lift detection module 50, the transition detection module 52, and the relative roll angle module 54 are used to determine a wheel departure angle in wheel departure angle module 60. Various sensor signals and the relative pitch angle in relative pitch angle module 56 are used to determine a relative velocity total in module 62. The road reference bank angle block 64 determines the bank angle. The relative pitch angle, the roll acceleration, and various other sensor signals as described below are used to determine the road reference bank angle. Other inputs may include a roll stability control event (RSC) and/or the presence of a recent yaw stability control event, and the wheel lifting and/or grounding flags.

The global roll angle of the vehicle is determined in global roll angle module 66. The relative roll angle, the wheel departure angle, and the roll velocity total blocks are all inputs to the global roll angle total module 66. The global roll angle total block determines the global roll angle $\theta_x$. An output module 68 receives the global roll angle total module 66 and the road reference bank angle from the road reference bank angle module 64. A roll signal for control is developed in roll signal module 70. The roll signal for control is illustrated as arrow 72. A sensitizing and desensitizing module 74 may also be included in the output module 68 to adjust the roll signal for control.

In the reference road bank angle module 64, the reference bank angle estimate is calculated. The objective of the reference bank estimate is to track a robust but rough indication of the road bank angle experienced during driving in both stable and highly dynamic situations, and which is in favor for roll stability control. That is, this reference bank angle is adjusted based on the vehicle driving condition and the vehicle roll condition. Most importantly, when compared to the global roll estimate, it is intended to capture the occurrence and physical magnitude of a divergent roll condition (two wheel lift) should it occur. This signal is intended to be used as a comparator against the global roll estimate for calculating the error signal which is fed back to roll stability controller 26.

Figure 6:
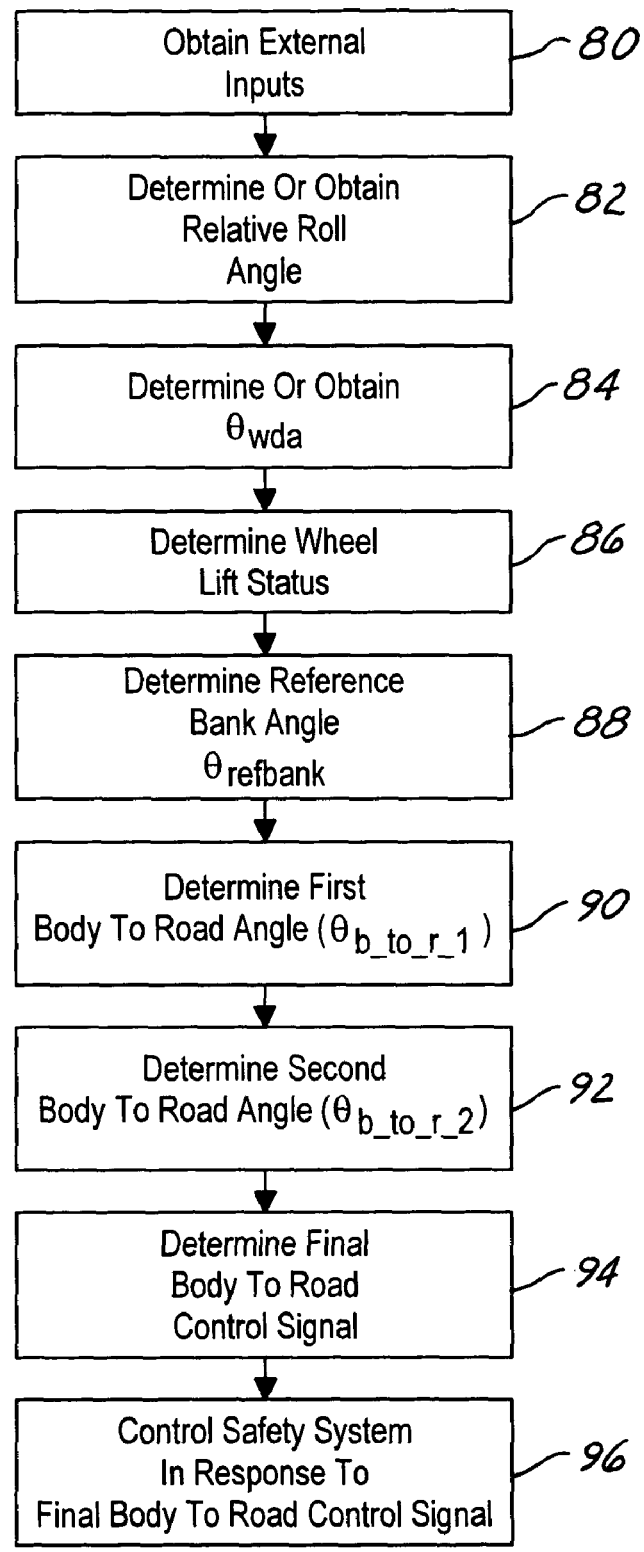
FIG. 6 is flow chart of the operation of one embodiment of the present invention.

Referring now to FIG. 6, the output module 68 is used to determine the actual signal used for the control law, i.e., the true relative roll angle between the vehicle body and the road surface. The signal is computed by integrating all the information available (including the calculated wheel departure angle in the wheel departure angle module, the wheel lifting flags from the wheel lifting detection module, the pre-charge active flags from the pressure command computation module or output module 69, the relative roll angle from the relative roll angle module 54, the global roll angle from the global roll angle module 66, the reference bank from the reference road bank module 64. Such roll signal for control must be the same as the relative roll angle computed from the relative roll angle module and it should also be the same when the vehicle is driven on level ground regardless of wheel lifting or not.

In step 80 various external inputs are determined. The inputs may be the sensor signals themselves or calculated signals derived from the sensor signals. One such signal is the Relative roll angle: $\theta_{xr}$. The relative roll angle is determined in the relative roll angle module 54.

One of the inputs may be pre-charge flags: $S_{pre-charge}(0)$ for front left wheel and $S_{pre-charge}(1)$ for front right wheel. The pre-charge flags indicate whether the brake pressure has been built up or set to build up in a particular hydraulic line.

The relative roll angle $\theta_{xr}$ may be determined as set forth in U.S. patent application Ser. No. 10/459,697, the disclosure of which is incorporated by reference herein. The relative roll angle $\theta_{xr}$ can be computed from the roll rate sensor output $\omega_{x-sensor}$ and the lateral acceleration sensor output $a_{y-sensor}$ as follows:

$$\dot{\theta}_{xr} = -c_1\theta_{xr} - c_2\dot{\omega}_{x-sensor} + c_3 a_{y-sensor}$$

where the coefficients in the equation can be related to the vehicle parameters as in the following:

$$c_1 = -\frac{K_{roll}}{D_{roll}}, \quad c_2 = \frac{I_x}{D_{roll}}, \quad c_3 = \frac{M_s h_{cg}}{D_{roll}}.$$

Where the suspension resultant roll stiffness and roll damping rates (including anti-roll-bars, suspensions, etc.) are respectively defined as $K_{roll}$ and $D_{roll}$, $M_s$ is the vehicle body mass (or the sprung mass of the vehicle), $h_{cg}$ is the height of the center of gravity of the vehicle and $\theta_{xr}$ as the relative angular displacement between the vehicle body and the average wheel axle. A digital algorithm using a Tyler expansion to the continuous time differential equation in order to obtain the digital version of the sensing algorithm can be used as in the following for estimating the relative roll angles:

$$\theta_{xr}(k+1) = \theta_{xr}(k) + \Delta T * f(k)$$

$$x(k+1) = x(k) + \Delta T * g(k)$$

$$\theta_{wda}(k+1) = \theta_{wda}(k) + \Delta T * x(k) + \Delta T^2 * g(k)$$

where $\Delta T$ is the sampling time of the implemented algorithm, x is an internal state variable for conducting the computation, f and g are calculated at each time step according to the following functional relationships $$f(k) = -c_1 \theta_{xr}(k) - c_2 \omega_{x\text{-}sensor}(k) + c_3 a_{y\text{-}sensor}(k)$$

$$g(k) = -d_1 \cos(\theta_{wda}(k)) + d_2 a_{y\text{-}sensor}(k)\cos(\theta_{xr}(k)) + d_3 \theta_{xr}(k) + d_4 \theta_{xr}(k)$$

where $$d_1 = \frac{(M_{uf} + M_{ur})l_w}{I_{wxf} + I_{wxr}} g, \quad d_2 = \frac{M_s(h - h_{cg})}{I_{wxf} + I_{wxr}},$$

$$d_3 = \frac{K_{roll}}{I_{wxf} + I_{wxr}}, \quad d_4 = \frac{D_{roll}}{I_{wxf} + I_{wxr}}$$

where $I_{wxf}$ and $I_{wxr}$ are the roll moments of inertia of the front and rear wheel/tire/suspension assemblies around the contact patches of the outer tires; $M_{uf}$ and $M_{ur}$ are the total masses of the front and rear wheel/tire/suspension assemblies; $l_w$ is the half of the wheel track.

In step 84, the wheel departure angle, $\theta_{wda}$ is also calculated or derived. The wheel departure angle, $\theta_{wda}$ may be determined as set forth in U.S. patent application Ser. No. 10/610,278 and U.S. provisional application No. 60/400,376, both of which are incorporated by reference herein. The wheel departure angle may be determined iteratively as:

$$\theta_{wda} = \theta_{wda} + RV \cdot p\_LOOP\_TIME\_SEC$$

where RV is the roll velocity, and p_LOOP_TIME_SEC is a time constant for a loop time. In the present example, 0.007 is used. This is an iterative process which uses a previous value of $\theta_{wda}$ in the calculation.

In step 86, wheel lift status flags, $S_{wld}(i)$, are determined. The wheel lift status flags are set forth as follows:

If the ith wheel is absolutely grounded, then $S_{wld}(i)$ =ABSOLUTELY_GROUNDED

If the ith wheel is in the edge of grounding, $S_{wld}(i)$ =POSSIBLY_GROUNDED

If the ith wheel is absolutely lifted, then $S_{wld}(i)$=ABSOLUTELY_LIFTED

If the ith wheel is in the edge of lifting $S_{wld}(i)$=POSSIBLY_LIFTED

If the ith wheel status cannot be firmly identified, $S_{wld}(i)$=NO_INDICATION

One way in which to determine the wheel lift status flags is described in U.S. patent application Ser. No. 10/608,909 and U.S. provisional application No. 60/400,172, the disclosures of which are incorporated by reference herein.

In step 88, the reference bank angle, $\theta_{refbank}$, is determined. One way in which to determine the reference bank angle is described in U.S. is described in U.S. patent application Ser. No. 10/610,280, the disclosure of which is incorporated by reference herein.

The outputs of module 68 are a body-to-road roll, $\theta_{b\_to\_r-1}$, a second body-to-road roll, $\theta_{b\_to\_r-2}$ and a roll signal for control, $\theta_{b\_to\_r}$.

The various calibratable parameters used herein are:
Smoothing ratio: $\rho$, default value 1.1.
Relative roll angle threshold: $\Theta$.
Where $\Theta = A_y \cdot \text{ROLL\_GRADIENT}$ and $A_y$ reflects the threshold for the percentage of
ROLL_GRADIENT, default value 75%.
Relative roll scaling: $\alpha$, default value 1.1.

In step 90, a first body to road angle $\theta_{b\_tor\_1}$ is determined. When the vehicle is moving with all four wheels contacting ground, the relative roll angle $\theta_{xr}$ calculated in the relative roll angle estimation module is a good estimate of 1 true relative roll angle $\theta_{b\_to\_r}$ between the vehicle body and the average road surface. The global roll angle of the vehicle body is $\theta_x$ (angle between vehicle body and the sea level). Then on level ground $$\theta_x = \theta_{b\_to\_r} = \theta_{xr} \quad (1)$$

When one or two inside wheels of the vehicle driven in a turn are lifted, equation (1) is not true even on level ground. One reason for this is that $\theta_{xr}$ captures the suspension roll angle or the roll angle between the vehicle body and the axles, while during wheel lifting one side of the wheels is in the air without touching the road surface.

Although the wheel lift status $S_{wld}$ generated from wheel lifting detection module 50 provides a rough indication about when the wheel lifting happens, it cannot be directly used to calculate control command quantitatively. The actual computation about how high the lifted wheels is useful. For example, if the wheel or wheels are lifted higher, a proportional higher braking pressure might be needed to control the rollover.

Such a quantitative characterization about how high the lifted wheels may be expressed by the angle between the axles and the road surface as in the following $$\theta_{a\_to\_r} = \frac{1}{2}\left\{\tan^{-1}\left[\frac{z_w(0) - z_w(1)}{t_f}\right] + \tan^{-1}\left[\frac{z_w(2) - z_w(3)}{t_r}\right]\right\} \quad (2)$$

where $z_w(i)$ is the vertical displacement of the center of the ith wheel with respect to the average road surface, $t_f$ is the front track and $t_r$ is the rear track. This angle may also be referred to as the wheel departure angle ($\theta_{wda}$). If such an angle $\theta_{a\_to\_r}$ can be obtained, then the true relative roll angle between the vehicle body and the road surface may be computed as $$\theta_{b\_to\_r} = \theta_{xr} + \frac{1}{2}\left\{\tan^{-1}\left[\frac{z_w(0) - z_w(1)}{t_f}\right] + \tan^{-1}\left[\frac{z_w(2) - z_w(3)}{t_r}\right]\right\} \quad (3)$$

Notice that using distance sensors to measure $z_w(i)$ is very costly. Therefore equation (3) is not feasible for practical implementation. An alternative method to obtain the axle-to-road roll angle $\theta_{a\_to\_r}$ is calculated as $\theta_{wda}$ in wheel departure angle computation module, where the roll rate sensor signal and the wheel lifting status are used. Using such wheel departure angle $\theta_{wda}$, the following body-to-road roll angle may be computed $$\theta_{b\_to\_r-1} = \theta_{wda} + \theta_{xr}. \quad (4)$$

Notice that the calculated first body-to-road roll angle $\theta_{b\_to\_r-1}$ is close to the actual body-to-road roll $\theta_{b\_to\_r}$ in majority of instances. However, such a determination may still introduce certain errors in some other cases. That is, $\theta_{b\_to\_r} \approx \theta_{b\_to\_r-1}$.

Another way to compute the true body-to-road relative roll angle $\theta_{b\_to\_r}$ is using the following relationship in step 92.

$$\theta_{b\_to\_r} = \theta_x - \theta_{bank} \quad (5)$$

where $\theta_{bank}$ is the road bank angle and $\theta_x$ is the global roll angle. Although the global roll angle $\theta_x$ can be computed from the global roll angle module 66, the difficulty of using equation (5) lies in the difficulty of accurately getting the road bank $\theta_{bank}$. Instead of accurately computing the road bank $\theta_{bank}$, a so-called reference bank $\theta_{refbank}$ is calculated in reference bank module 64. Using this $\theta_{refbank}$, a second body-to-road roll is computed as in the following $$\theta_{b\_to\_r-2} = \theta_x - \theta_{refbank}. \quad (6)$$

Such a reference bank $\theta_{refbank}$ uses the available vehicle states to determine if the vehicle is in divergent or convergent stability trend (as shown in FIG. 3A–D) so this information to be used for adjusting $\theta_{refbank}$ and for obtaining a control-favorable quantity to reflect $\theta_{b\_to\_r}$, i.e., an angle which would not have adverse effect in control activations.

When the wheel or wheels are contacting the road surface, the true body-to-road relative roll angle $\theta_{b\_to\_r}$ must be equal to the suspension relative roll $\theta_{xr}$. In order to avoid a sudden jump in $\theta_{b\_to\_r}$, the following scheme is used to adjust $\theta_{refbank}$:

if ($S_{wld}(0)$=ABSOLUTELY_GROUNDED)

$\theta_{refbank} = \theta_x - \theta_{xr} + (\theta_{refbank} - \theta_x + \theta_{xr})/\rho$;

if ($S_{wld}(1)$=ABSOLUTELY_GROUNDED)

$\theta_{refbank} = \theta_x - \theta_{xr} + (\theta_{refbank} - \theta_x + \theta_{xr})/\rho$;

if ($S_{wld}(2)$=ABSOLUTELY_GROUNDED)

$\theta_{refbank} = \theta_x - \theta_{xr} + (\theta_{refbank} - \theta_x + \theta_{xr})/\rho$;

if ($S_{wld}(3)$=ABSOLUTELY_GROUNDED)

$\theta_{refbank} = \theta_x - \theta_{xr} + (\theta_{refbank} - \theta_x + \theta_{xr})/\rho$; (7)

With the above computed $\theta_{refbank}$, $\theta_{b\_to\_r-2}$ can be computed as:

$$\theta_{b\_to\_r-2} = \left(1 - \frac{1}{\rho}\right)\theta_{xr} + \frac{1}{\rho}\theta_{b\_to\_r-2} \quad (8)$$

If one or two wheels at the same side of the vehicle are lifted, the above computation for $\theta_{b\_to\_r-2}$ is no longer accurate since the wheel departure angle $\theta_{a\_to\_r}$ has been counted as part of the road bank angle. It is natural to use the calculated wheel departure angle to correct this. This consideration leads to the following integrated algorithm between $\theta_{b\_to\_r-1}$ and $\theta_{b\_to\_r-2}$.

Considering the above, the first $\theta_{b\_to\_r-1}$ as in equation (4) or step 90. In order to bring the calculated wheel departure angle for correction, the time when the wheel or the wheels are actually lifted is determined. Due to the potential delay in the wheel lift detections, an extended version of wheel lifting conditions have been used. Those conditions include large magnitude of the suspension relative roll angle $\theta_{xr}$, aggressive transitional maneuver (characterized by pre-charge active flags), and the wheel lifting flags. Consider the case when the vehicle is turned to left, i.e., positive roll angles are determined.

if (($\theta_{xr} \geq \Theta$ (9)
&& $S_{wld}(0)$ != ABSOLUTELY_GROUNDED
&& $S_{wld}(2)$ != ABSOLUTELY_GROUNDED)
|| PRECHARGE_ACTIVE == 1
|| $S_{wld}(0)$ == ABSOLUTELY_LIFTED
|| $S_{wld}(2)$ == ABSOLUTELY_LIFTED
)
{
 $\theta_{refbank}$ = min($\theta_x - \theta_{b\_to\_r-1}$, $\theta_{refbank}$);

-continued

}
$\theta_{b\_to\_r-2} = \theta_x - \theta_{refbank}$;

where $\theta_{b\_to\_r-1}$ is computed as in equation (4). Consider that during double wheel lifting, a more aggressive braking pressure to control the vehicle roll is needed. A boosted body-to-road relative roll angle is calculated based on a scaled $\theta_{b\_to\_r-1}$:

$$\theta_{b\_to\_r-\alpha} = \alpha^* \theta_{xr} + \theta_{wda} \quad (10)$$

where $\alpha > 1$. Using this $\theta_{b\_to\_r-\alpha}$, the following computation of $\theta_{b\_to\_r-2}$ is obtained:

if ( $S_{wld}(0)$ == ABSOLUTELY_LIFTED (11)
  && $S_{wld}(2)$ == ABSOLUTELY_LIFTED )
{
  $\theta_{refbank}$ = min($\theta_x - \theta_{b\_to\_r-\alpha}$, $\theta_{refbank}$);
}
$\theta_{b\_to\_r-2} = \theta_x - \theta_{refbank}$;

Similarly when the vehicle is turning right, the following computations are used for $\theta_{b\_to\_r-2}$:

if (($\theta_{xr} < -\Theta$ (12)
  && $S_{wld}(1)$ != ABSOLUTELY_GROUNDED
  && $S_{wld}(3)$ != ABSOLUTELY_GROUNDED)
  || FL_PRECHARGE_ACTIVE == 1
  || $S_{wld}(1)$ == ABSOLUTELY_LIFTED
  || $S_{wld}(3)$ == ABSOLUTELY_LIFTED
)
{
  $\theta_{refbank}$ = max($\theta_x - \theta_{b\_to\_r-1}$, $\theta_{refbank}$);
}
$\theta_{b\_to\_r-2} = \theta_x - \theta_{refbank}$;

and for double wheel lifting if ( $S_{wld}(1)$ == ABSOLUTELY_LIFTED (13)
  && $S_{wld}(3)$ == ABSOLUTELY_LIFTED )
{
  $\theta_{refbank}$ = max($\theta_x - \theta_{b\_to\_r-\alpha}$, $\theta_{refbank}$);
}
$\theta_{b\_to\_r-2} = \theta_x - \theta_{refbank}$;

With the above two computations of body-to-road relative roll angle, a third version can be obtained as the linear combination of the two body to road angles. That is, a final body to road angle is determined in step 94.

$$\theta_{b\_to\_r} = \beta^* \theta_{b\_to\_r-1} + (1-\beta)^* \theta_{b\_to\_r-2} \quad (14)$$

where $\beta$ is a positive number with magnitude less than 1.

Based on the final body to road angle, at least one safety system 38, such as systems 40–45 for the automotive vehicle can be controlled. For example, brakes or steering may be applied to prevent the vehicle from rolling over.

While particular embodiments of the invention have been shown and described, numerous variations and alternate embodiments will occur to those skilled in the art. Accordingly, it is intended that the invention be limited only in terms of the appended claims.

What is claimed is:

1. A method for controlling a safety system of an automotive vehicle comprises:
   determining a first body to road angle from a wheel departure angle;
   determining a second body to road angle;
   determining a final body to road angle from the first body to road angle and the second body to road angle; and
   controlling a safety system in response to the final body to road angle.

2. A method as recited in claim 1 wherein determining a first body to road angle comprises determining the first body to road angle from the wheel departure angle and a global roll angle.

3. A method as recited in claim 1 wherein determining a second body to road angle comprises determining the second body to road angle in response to a global roll angle and a reference bank angle.

4. A method as recited in claim 3 further comprising determining the reference bank angle in response to a wheel lift status.

5. A method as recited in claim 3 further comprising determining the reference bank angle in response to a wheel lift status, the global roll angle, and a relative roll angle.

6. A method as recited in claim 3 further comprising determining the reference bank angle in response to a wheel lift status, a pre-charge status, the global roll angle, and the first body to road angle.

7. A method as recited in claim 1 wherein determining a second body to road angle comprises determining a second body to road angle in response to a smoothing ratio, a relative roll angle, and a previous second body to road angle.

8. A method as recited in claim 7 wherein when a two wheel lift status is present, determining the first body to road angle as a function of a scaling factor, the relative roll angle and a wheel departure angle.

9. A method as recited in claim 7 further comprising multiplying the scaling factor by the relative roll angle.

10. A method of controlling a safety system of an automotive vehicle comprises:
    determining a wheel departure angle;
    determining a relative roll angle;
    determining a first body to road angle in response to the wheel departure angle and the relative roll angle;
    determining a reference bank angle;
    determining a global roll angle;
    determining a second body to road angle from the reference bank angle and the global roll angle;
    determining a final body to road angle from the first body to road angle and the second body to road angle; and
    controlling a safety system in response to the final body to road angle.

11. A method as recited in claim 10 wherein determining a reference bank angle comprises determining the reference bank angle in response to a wheel lift status, the global roll angle, and the relative roll angle.

12. A method as recited in claim 10 wherein determining a reference bank angle comprises determining the reference bank angle in response to a wheel lift status, a pre-charge status, the global roll angle, and the first body to road angle.

13. A method as recited in claim 10 wherein determining a second body to road angle comprises determining a second body to road angle in response to a smoothing ratio, a relative roll angle, and a previous second body to roll angle.

14. A method as recited in claim 13 wherein when a two wheel lift status is present, determining the first body to road angle as a function of a scaling factor, a relative roll angle and a wheel departure angle.

15. A method as recited in claim 13 further comprising multiplying the scaling factor by the relative roll angle.

16. A method of controlling a safety system of an automotive vehicle comprising:
    determining a wheel departure angle;
    determining a relative roll angle;
    determining a first body to road angle in response to the wheel departure angle and the relative roll angle;
    determining a wheel lift status;
    when the wheel lift status is grounded, determining a second body to road angle based on a previous second body to road angle and a relative roll angle;
    when the wheel lift status is one wheel lifted, determining a second body to road angle based on a reference bank angle and a global roll angle;
    when the wheel lift status is two wheel lifted,
    determining a second body to road angle based on a reference bank angle based on a scaled first body to road bank angle and a global roll angle;
    determining a final body to road angle from the first body to road angle and the second body to road angle; and
    controlling a safety system in response to the final body to road angle.

17. A method as recited in claim 16 wherein determining a second body to road angle comprises determining a second body to road angle in response to a smoothing ratio, a relative roll angle, and a previous second body to roll angle.

18. A method as recited in claim 17 wherein when a two wheel lift status is present, determining the first body to road angle as a function of a scaling factor, a relative roll angle and a wheel departure engle.

19. A method as recited in claim 17 further comprising multiplying the scaling factor by the relative roll angle.

20. A control system for an autorriotive vehicle having a safety system comprising:
    a controller programmed to perform the steps of:
    determining a first body to road angle from a wheel departure angle;
    determining a second body to road angle;
    determining a final body to road angle from the first body to road angle and the second body to road angle; and
    controlling the safety system in response to the final body to road angle.

21. A control system as recited in claim 20 wherein determining a second body to road angle comprises determining the second body to road angle in response to a global roll angle and a reference bank angle.

22. A control system as recited in claim 21 wherein the controller is programmed to further perform the step of comprising determining the reference bank angle in response to a wheel lift status.

23. A control system as recited in claim 21 wherein the controller is programmed to further perform the step of determining the reference bank angle in response to a wheel lift status, the global roll angle, and a relative roll angle.

24. A control system as recited in claim 21 wherein the controller is programmed to further perform the step of determining the reference bank angle in response to a wheel lift status, a pre-charge status, the global roll angle, and the first body to road angle.

25. A method of controlling a safety system of an automotive vehicle comprising:

determining a relative roll angle and a wheel departure angle;

determining a body to road angle in response to the wheel departure angle and the relative roll angle; and controlling a safety system in response to the body to road angle.

* * * * *